July 3, 1934.   C. PATOCK   1,965,354
GRIP FOR KITCHEN UTENSILS
Filed Dec. 19, 1932
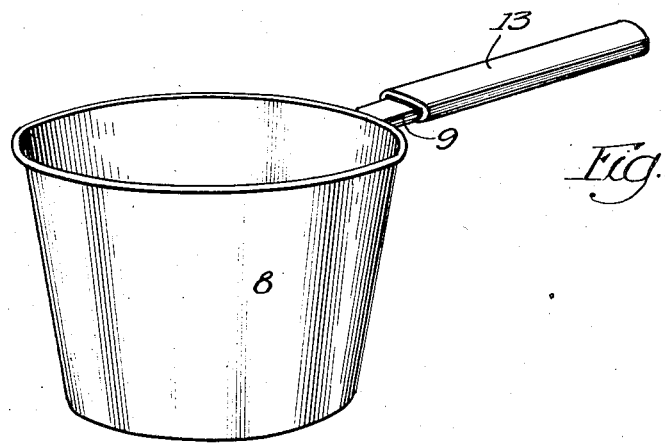
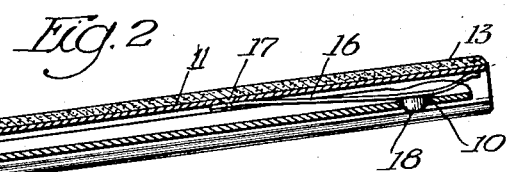
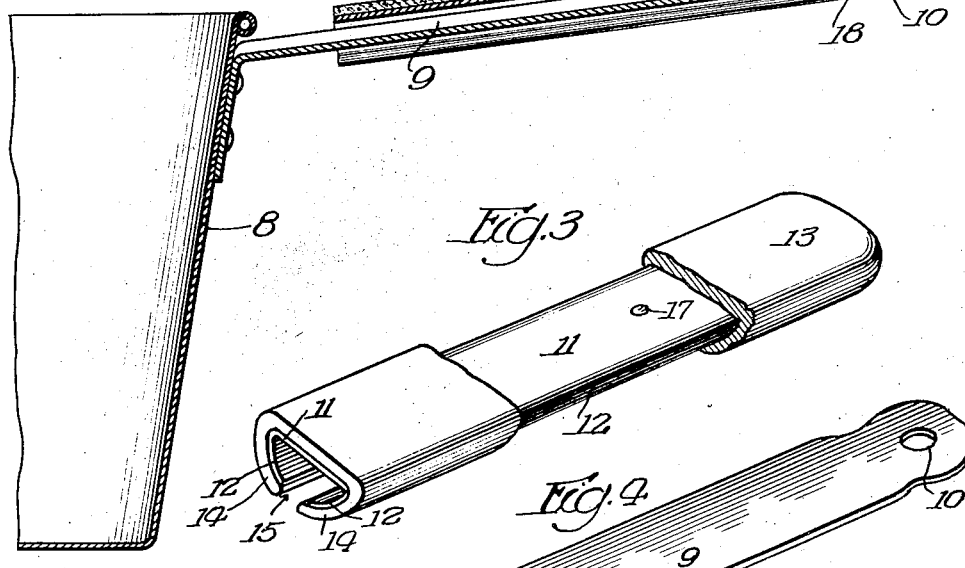
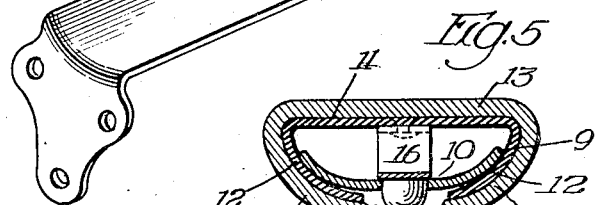
Inventor
Charles Patock
By Fred Gerlach his Atty.

Patented July 3, 1934

1,965,354

UNITED STATES PATENT OFFICE 1,965,354

GRIP FOR KITCHEN UTENSILS

Charles Patock, Chicago, Ill., assignor of one-half to Frederick E. Hummel, Chicago, Ill.

Application December 19, 1932, Serial No. 647,846

3 Claims. (Cl. 16—114)

The invention relates to detachable heat insulating grips for kitchen utensils and its object is to provide a grip which can be interlocked to the usual handle of a utensil and which can be manufactured at a low cost.

The invention consists in the several novel features hereinafter set forth and more particularly defined by claims at the conclusion hereof.

In the drawing: Fig. 1 is a perspective illustrating the grip applied to the handle of a utensil. Fig. 2 is a section through the grip and handle of the utensil. Fig. 3 is a perspective of the grip, portions being broken away for illustration. Fig. 4 is a perspective of the utensil handle. Fig. 5 is a transverse section through the grip and handle.

The invention is exemplified as applied to a cooking vessel 8 which is provided with a fixed handle 9 having the usual hole 10 whereby it may be hung up. Handles of this type are usually curved in cross-section.

The improved grip comprises a plate of metal bent to form a wall or member 11 which is adapted to overlie the handle 9 and bent also to form inturned, downwardly curved converging walls or flanges 12 which are adapted to extend around and underlap the side margins of the handle. These walls form a channel which is adapted to receive the handle 9. A covering 13 of suitable insulating material, such, for example, as asbestos, is fixedly secured in any suitable manner to the outer face of the wall 11 and the outer faces of walls or flanges 12. The inner end of the grip is open, so that it can be slipped endwise over, and withdrawn from, the handle. This construction makes it possible to manufacture the grip by a simple bending operation of the plate and then covering the outside thereof with insulating material so that the grip can be produced at a low cost. The channel formed between the wall 11 and the divergent walls or flanges 12 is adapted for use with handles of different shapes and widths.

In practice it is desirable to lock the grip to the handle to avoid their accidental separation while the vessel is being handled. For this purpose, a locking device is provided inside of the grip. This device consists of a flat spring 16 which has one of its ends riveted, as at 17, to the top wall 11 and carries a downwardly extending button 18 of insulating material which is adapted to snap into the hole 10 in the handle, while the grip is being slipped onto the handle. The lower end of the button is accessible through the space between the inner ends of the flanges 12 so it can be pressed upwardly to release the grip for withdrawal from the handle. The free end of spring 16 may be extended from button 18 to ride on the inner face of the wall 11, so the spring will exert a substantial pressure. A portion of this spring bears on the top of the handle and exerts an upward pressure on the grip relatively to the handle, so the walls 12 will engage the under side of the handle and hold the grip firmly on the handle.

The invention exemplifies an insulating grip for kitchen utensils which is equipped with a releasable locking device and which can be produced at a low cost.

The invention is not to be understood as restricted to the details set forth, but may be modified within the scope of the appended claims without departing from the spirit of the invention.

Having thus described my invention, what I claim as new and desire to secure by Letters Patent is:

1. As a new article of manufacture, a grip adapted to be slipped endwise onto the handle of a cooking utensil and comprising an elongated substantially flat, top part adapted to overlie the handle substantially from one end thereof to the other and having at the sides thereof downwardly and inwardly extending flanges which form with the top part an open-ended channel for the utensil handle and are adapted to surround and underlie the side margins of the handle, and means in the outer end of the channel for releasably holding the grip in latched relation with respect to the utensil handle consisting of a spring-supported button carried by the grip and arranged to enter the usual hole in the outer end of the utensil handle.

2. As a new article of manufacture, a grip adapted to be slipped endwise onto the handle of a cooking utensil and comprising an elongated top part adapted to overlie the handle substantially from one end thereof to the other and having at the sides thereof downwardly and inwardly extending flanges which form with the top part an open-ended channel for receiving loosely the utensil handle and are adapted to surround and underlie the side margins of the handle and have the free or inner side edges thereof spaced apart, and a leaf spring disposed longitudinally in the channel and attached to the under face of the top part so that it operates to force said top part away from the handle and to bring the flanges into direct contact with the side margins of the handle.

3. As a new article of manufacture, a grip adapted to be slipped endwise onto the handle of a cooking utensil and comprising an elongated substantially flat top part adapted to overlie the handle substantialy from one end thereof to the other and having at the sides thereof downwardly and inwardly extending flanges which form with the top part an open-ended channel for receiving loosely the utensil handle and are adapted to surround and underlie the side margins of the handle and have the free or inner side edges thereof spaced apart, a leaf spring disposed wholly within the outer end of the channel and attached to the under face of the top part of the grip so that it operates to force said top part away from the handle and to bring the flanges into direct contact with the side margins of the handle, and a depending button on the spring adapted to extend through the usual hole in the outer end of the utensil handle in order to hold the grip in latched relation with respect to the handle and positioned in the space between the free or inner side edges of the flanges so that it may be readily pressed upwardly out of the hole in the utensil handle to release the grip.

CHARLES PATOCK.